United States Patent Office 2,749,327
Patented June 5, 1956

2,749,327

REACTION PRODUCT OF DIHYDRIC ALIPHATIC ALCOHOLS AND POLYMETHYLOL BENZENES

Robert W. Martin, Lafayette, Calif., assignor to General Electric Company, a corporation of New York No Drawing. Application October 9, 1952,
Serial No. 313,980

2 Claims. (Cl. 260—52)

This invention is concerned with novel rubber-like polymers. More particularly, the invention relates to compositions of matter obtained by condensing a difunctional dihydric aliphatic alcohol with 2,6-dimethylol-4-methyl anisole.

Various synthetic rubbers are now known in the art. Many of these rubbers have the disadvantage that they are soluble to a large extent in common solvents. I have now discovered that I am able to obtain new types of synthetic products having rubbery properties by condensing a dihydric aliphatic alcohol with a polymethylol benzene, specifically, 2,6-dimethylol-4-methyl anisole. The condensation products obtained as a result of the reaction are rubbery in character, and convertible by heat to substantially insoluble and infusible products. Even the uncured gums or soft rubbery materials obtained by the first condensation reaction are only slightly soluble in solvents, for example, a mixture of solvents composed of amyl acetate and toluene. Generally, in order to obtain partial solution of the early condensation products in such solvents, it is necessary to heat the solvents to their boiling points prior to incorporation of the rubbery products.

Examples of dihydric aliphatic compounds which may be employed in the practice of the invention are, for example, ethylene glycol, propylene glycol, diethylene glycol, triethylene glycol, dipropylene glycol, trimethylene glycol, tetramethylene glycol, 1,4-butanediol, etc.

In preparing the rubber-like polymers hereindescribed, the dihydric aliphatic alcohol (for brevity hereinafter referred to as "alcohol") and the 2,6-dimethylol-4-methyl anisole which has the formula I 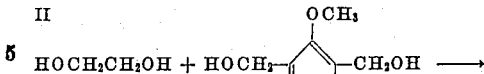

are heated together at temperatures of from about 125° to 200° C. for times varying from about 30 minutes to 8 or more hours, preferably in the presence of an acidic catalyst, as, for instance, sulfamic acid, paratoluene sulfonic acid, aniline sulfate, urea hydrochloride, morpholine sulfate, etc., in such a ratio that there is at least one mol of the 2,6-dimethylol-4-methyl anisole (hereinafter referred to as the "anisole") per mol of alcohol. Generally, I may employ from about 1 to about 1.5 or more mols of the anisole per mol of the alcohol. Quantities of anisole in excess of 1.5 mols per mol of the alcohol will decrease the rubbery nature of the polymer and give harder products. During the condensation between the alcohol and the anisole, it is desirable to stir the reaction mass and, at the same time, to remove the water being formed as a result of the reaction. Generally, the reaction involved is believed to take place in accordance with the following equation, where the dihydric alcohol employed is ethylene glycol:

II 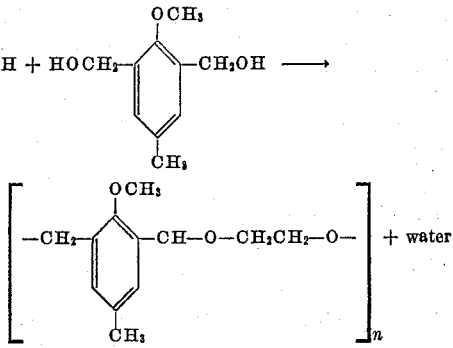

No attempt has been made to balance the equation since the number of alcohol molecules and the number of methylol benzene molecules which may react can vary. It is sufficient to point out, however, that there will be present in the polymeric structure the recurrent structure unit defined as II above where $n$ is an integer greater than 1. It should be noted that the size of the molecules can be controlled to some extent by the time or temperature at which the condensation reaction is conducted. After condensation has taken place, the polymeric molecule may have terminal hydroxyl groups, some of which may be terminal hydroxyl groups of the alcohol or terminal hydroxyl groups of the anisole. Whichever hydroxy group is present, and the exact character of the hydroxyl group is not known, it will be apparent that further condensation can take place, for example, during any molding operation or further heat-treatment of the polymer.

It is essential that one employs the monomeric 2,6-dimethylol-4-methyl anisole, rather than any polymers therefrom since attempts to intercondense the polymer of 2,6-dimethylol-4-methyl anisole with, for instance, butanediol-1,4, does not give rubbery materials similar to those obtained by using the monomeric anisole. It is also desired to point out that the condensation of butanediol-1,4 by itself using as condensing agents acids similar to those employed in the practice of the present invention, merely gives a black tar.

In order that those skilled in the art may better understand how the present invention may be practiced, the following example is given by way of illustration and not by way of limitation. All parts are by weight.

*Example 1*

Para-cresol dialcohol having the formula

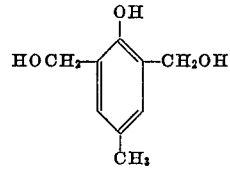

was prepared by dissolving 540 grams of para-cresol in 770 grams of an aqueous sodium hydroxide solution containing 220 grams of sodium hydroxide. The solution was cooled and mixed with 830 grams of aqueous formaldehyde (37.2 per cent CH$_2$O). The mixture was held at 30° to 40° C. for two hours and then allowed to stand for about 15 hours at room temperature. The sodium salt of para-cresol dialcohol thus prepared was separated and neutralized with dilute acetic acid to give the crystalline dialcohol. There was thus obtained 791 grams of product which had a melting point of 132° C. (literature melting point 132–133° C.). Analysis of this material showed it to contain 64.5 per cent carbon, 7.19 per cent hydrogen, and 36.8 per cent methylol groups (calculated 64.25 per cent carbon, 7.19 per cent hydrogen, and 36.9 per cent methylol groups).

*Example 2*

The para-cresol dialcohol described in Example 1 (178.8 grams) was added to a solution of 64 grams of sodium hydroxide dissolved in 600 ml. water. This mixture was treated by mixing in with rapid stirring 140 grams of dimethyl sulfate. Stirring was continued for about two hours and thereafter the mixture was cooled to give a precipitate which was removed by filtration. There was thus obtained 30 grams of 4-methyl-2,6-dimethylol anisole, melting at about 107° C. (literature melting point 106° C.). The identity of this compound was established by analyses which showed that the compound contained 65.6 per cent carbon (theoretical 65.8 per cent), 7.72 per cent hydrogen (theoretical 7.74 per cent), and 32.85 per cent methylol groups (theoretical 34.15 per cent).

*Example 3*

Equal molar quantities of butanediol-1,4 (21.7 parts) and 2,6-dimethylol-4-methyl anisole (44 parts) were heated in the presence of about 0.1 part sulfamic acid at 170–183° C. for 40 minutes. Thereafter, the temperature was raised to about 195° C. and held at this temperature for one hour. There was thus obtained a soft rubber weighing about 47 parts, by weight. This rubber was boiled with a 1:1 solution of toluene and amyl acetate. Less than half of the polymer dissolved, the remainder forming a highly swollen gel.

*Example 4*

In this example, 45 parts of butanediol-1,4 and 91 parts of 2,6-dimethylol-4-methyl anisole were heated together at 190° C. for about 6¼ hours, the last two hours of the heating being carried out at a reduced pressure of 30 mm. The product thus obtained was a rubbery gum with approximately 700 per cent elongation at break. When 40 parts of this gum were sheeted with 30 parts of carbon black on rubber differential rolls, a shiny black flexible sheet was obtained, which had satisfactory strength.

*Example 5*

About 21.2 parts diethylene glycol, 36.4 parts 2,6-dimethylol-4-methyl anisole, and 0.05 part sulfamic acid were placed in a reaction vessel and immersed in an oil bath at about 190° C. for a total heating time of 129 minutes. The product thus obtained weighed about 44.3 parts, by weight, and was a soft rubber-like polymer. Two parts of the polymer were milled on rubber differential rolls with one part of a silica aerogel filler. The milled stock was molded in a mold at 175° C. at 3400 p. s. i. for about 10 to 15 minutes to give a tough, rubbery molded piece which, when stretched and released, returned to its original size.

It will, of course, be apparent to those skilled in the art that instead of using the various dihydric aliphatic alcohols described in the foregoing examples, other alcohols, many of which have been mentioned above, can be employed in their place without departing from the scope of the invention. The conditions whereby the condensation between the alcohol and the methylol benzene may take place may also be varied within wide limits as will be apparent to persons skilled in the art.

The compositions herein disclosed and claimed can be used in combination with various fillers including lithopone, titanium dioxide, iron oxide, talc, silica, etc., to make molding compositions. In addition, the polymeric materials hereindescribed, in combination with various pigments and dyes, can be dissolved in suitable solvents to make coating compositions which can be used for protective or insulating purposes. Further applications for the material may be as shock absorbers or as gaskets in applications requiring resistance to solvents to which the usual synthetic rubbers are not satisfactorily resistant.

What I claim as new and desire to secure by Letters Patent of the United States is:

1. A rubbery, polymeric, organic solvent-resistant composition of matter consisting of the product of reaction of (1) 1 mol of an unsubstituted dihydric aliphatic alcohol and (2) 1 to 1.5 mols of 2,6-dimethylol-4-methyl anisole, said reaction taking place at a temperature of from about 125° to 200° C. and in the presence of an acidic catalyst.

2. The composition of claim 1 in which the dihydric aliphatic alcohol is butanediol-1,4.

References Cited in the file of this patent

UNITED STATES PATENTS

| | | |
|---|---|---|
| 2,581,464 | Zech | Jan. 8, 1952 |
| 2,606,929 | Martin | Aug. 12, 1952 |
| 2,606,935 | Martin | Aug. 12, 1952 |